US012595128B2

(12) United States Patent
Yamashita et al.

(10) Patent No.: US 12,595,128 B2
(45) Date of Patent: Apr. 7, 2026

(54) WAREHOUSE FOR ORDER FULFILMENT

(71) Applicant: Dematic GmbH, Heusenstamm (DE)

(72) Inventors: Shin Yamashita, Oberursel (DE);
Yoshihiro Sasaki, Chiba (JP);
Max-Reinhard Lewandoske,
Aschaffenburg (DE)

(73) Assignee: Dematic GmbH, Heusenstamm (DE)

( * ) Notice: Subject to any disclaimer, the term of this
patent is extended or adjusted under 35
U.S.C. 154(b) by 704 days.

(21) Appl. No.: 17/923,736

(22) PCT Filed: May 8, 2020

(86) PCT No.: PCT/EP2020/062889
§ 371 (c)(1),
(2) Date: Nov. 7, 2022

(87) PCT Pub. No.: WO2021/223883
PCT Pub. Date: Nov. 11, 2021

(65) Prior Publication Data
US 2023/0174309 A1      Jun. 8, 2023

(51) Int. Cl.
B65G 1/137          (2006.01)
(52) U.S. Cl.
CPC ................................. B65G 1/1378 (2013.01)
(58) Field of Classification Search
CPC .................................................... B65G 1/1378
See application file for complete search history.

(56) References Cited

U.S. PATENT DOCUMENTS 11,136,192 B2 * 10/2021 Ahmann ................. B25J 5/007
2004/0197171 A1   10/2004 Freudelsperger 2012/0282068 A1   11/2012 Tschurwald et al.
2015/0104286 A1    4/2015 Hansl et al.
2015/0114799 A1    4/2015 Hansl et al.
2016/0355340 A1   12/2016 Meurer
2018/0009605 A1    1/2018 Collin et al.
(Continued)

FOREIGN PATENT DOCUMENTS

CN        105392719 A       3/2016
CN        105473468 A       4/2016
CN        110062740 A       7/2019
(Continued)

OTHER PUBLICATIONS

International Search Report and Written Opinion of the International Searching Authority in English from corresponding Patent Cooperation Treaty (PCT) Application No. PCT/EP2020/062889, indicated completed on Jan. 11, 2021.

*Primary Examiner* — Kyle O Logan
(74) *Attorney, Agent, or Firm* — Gardner, Linn, Burkhart & Ondersma LLP

(57)          ABSTRACT

A warehouse for order fulfilment with a product storage and at least one order fulfillment level in which picking stations are arranged and supplied with articles from the product storage for picking into order load carriers according to allocated orders wherein each picking station is supplied with articles from the product storage by a connecting conveyor system on the least one order fulfillment level, where each order fulfillment level has at least one further virtual order fulfillment level in which picking stations are arranged at different height from the at least one order fulfillment level.

18 Claims, 15 Drawing Sheets

(56)        References Cited

U.S. PATENT DOCUMENTS

2020/0143127 A1 *    5/2020    Wagner ................. B65G 47/91

FOREIGN PATENT DOCUMENTS

| | | | |
|---|---|---|---|
| DE | 10200077 | A1 | 12/2002 |
| DE | 10136354 | B4 | 6/2010 |
| DE | 102018114026 | A1 | 12/2019 |
| EP | 0092848 | A2 | 11/1983 |
| EP | 1179491 | A1 | 2/2002 |
| EP | 1886943 | A1 | 2/2008 |
| EP | 2769936 | A1 | 8/2014 |
| EP | 3166058 | A1 | 5/2017 |
| JP | H0753017 | A | 2/1995 |
| JP | 2016526520 | A | 9/2016 |
| JP | 2016537282 | A | 12/2016 |
| JP | 2017030974 | A | 2/2017 |
| JP | 2018127344 | A | 8/2018 |
| WO | 2012069327 | A1 | 5/2012 |
| WO | 2013033743 | A1 | 3/2013 |
| WO | 2017110499 | A1 | 6/2017 |
| WO | 2018006112 | A1 | 1/2018 |
| WO | 2019008084 | A1 | 1/2019 |
| WO | 2019008097 | A1 | 1/2019 |
| WO | 2020066885 | A1 | 4/2020 |
| WO | 2020113249 | A1 | 6/2020 |

* cited by examiner

WAREHOUSE FOR ORDER FULFILMENT

CROSS REFERENCE TO RELATED APPLICATION

The present application claims the priority benefits of International Patent Application No. PCT/EP2020/062889, filed May 8, 2020

BACKGROUND AND FIELD OF THE INVENTION

The invention relates to a warehouse for order fulfilment with a product storage and at least one order fulfillment level in which picking stations are arranged and supplied with articles from the product storage for picking into order load carriers according to allocated orders.

Pick performance of picking stations are limited by many factors such as operator efficiency, ergonomics, order/SKU profiles, business rules etc. On the other hand, storage and retrieval systems feeding picking stations from storage racking, such as MultiShuttle, are constantly improving in retrieval performance as technology becomes more sophisticated.

The picking station performance are becoming limiting factors of Goods-To-Person operations. The popular measure is to increase the picking station quantity. Increasing picking station quantity requires more floor space and conveyors connecting storage and retrieval system and pick stations. As a result, those sometimes will not fit a given space.

Expanding vertically by adding more levels is a common measure but it has a need for extra floor level(s) or incurs extra construction of mezzanine floor. Both of which are realized with an expense of vertical space and investment. Such mezzanine floors are not even possible in some countries due to fire regulations like Japan.

DE 101 36 354 B4 describes a picking method and a picking system for picking, having a container store and associated storage and retrieval machine for removing the containers from and placing them in storage in the container store to and from at least two picking workstations in an order fulfillment level, and having a distribution system for distributing the containers to the individual workstations. A selected container of the container rack is moved via the storage and retrieval machine of a selected storage and retrieval machine, which is operated separately for each workstation, to the picking workstation and that after treatment of the container at the workstation, the container is returned to the container rack via the selected conveyor track. While this allows an efficient supply of articles to the picking station by the dedicated conveyor, it is space consuming.

SUMMARY OF THE INVENTION

The present invention provides an optimized use of space, especially vertical space, in a warehouse.

In accordance with an aspect of the invention, it has been recognized that if each order fulfillment level has at least one further virtual order fulfillment level in which picking stations are arranged at different height from the at least one order fulfillment level, it is possible to use the given vertical space more effectively.

In other words, no change of the building construction by realization of further order fulfilment "floors" or mezzanine constructions are necessary. The idea behind the invention is to use the given order fulfilment level (floor) and amend it by adding a virtual order fulfilment level on the same floor but at a different height, meaning that not only the picking station but also the respective connecting conveyor system is arranged at the different height.

According to an embodiment this can be achieved if the picking stations are arranged at different height from the at least one order fulfillment level creating (defining) the virtual order fulfillment level by vertically raising the picking stations, especially by using raised platforms.

Each order fulfillment level, be it real or virtual, may have dedicated conveyor systems for supply and discharge of articles and/or orders. These conveyor systems may interface with each other. It is also possible to have shared conveyor systems that share common conveyors and interface from the different levels, i.e. heights of the order fulfilment levels. Accordingly, the picking stations arranged in the virtual order fulfillment level(s) may be connected to the product storage for supply with articles from the product storage by at least a second connecting conveyor system arranged at a different height than that of the first connecting conveyor system.

In one preferred embodiment the connecting conveyor system is a connecting conveyor system arranged between the product storage and the order fulfillment area and picking stations therein. This may include but is not limited to the arrangement of the connecting conveyor in the so-called front-zone. It is also possible to arrange said connecting conveyor system so as to be connected to a conveyor loop transporting product from storage to order fulfillment area and/or any further conveying system irrespective of where the products are conveyed from (originate) and transported to (dispatched).

In a preferred embodiment, the connecting conveyor system is a cross-aisle conveyor running the length of the front of the storage segmenting the pre-zone (front-zone).

Alternatively or additionally the connecting conveyor system may connect to a conveyor loop transporting goods from storage to order fulfillment area and/or any conveying system irrespective of where the goods are conveyed from (originate) and transported to (dispatched). The connecting conveyor systems will usually include a main conveyor and interface conveyors branching off this main conveyor connecting/interfacing with the picking stations. The first connecting conveyor system may be arranged below picking stations arranged in the virtual order fulfillment level(s).

Alternatively, the picking stations arranged in both the at least one and virtual order fulfillment levels can be connected to the product storage for supply with articles from the product storage by common vertically movable connecting conveyor system, which e.g. could then interface between dedicated conveyor sections, e.g. using interface conveyors. The respective vertically moveable conveyor section could e.g. be a ramp, that is lowered and raised between the at least two levels or tilted accordingly.

According to a further possibility, the picking stations arranged in the virtual order fulfillment level(s) are connected to the product storage for supply with articles from the product storage by a at least the second connecting conveyor system arranged horizontally offset to that of the first connecting conveyor system. When the connecting conveyor systems are offset horizontally, the second connecting conveyor system and/or the first connecting conveyor system are curved around the respective picking stations in the other level, so that they may still be connected to the respective picking stations directly.

According to aspects of the invention, it is possible that the picking stations are grouped to include a picking station in each level in a horizontally staggered manner (e.g. in longitudinal direction of a respective aisle). In this manner the at least two picking stations of the respective group are horizontally arranged to share airspace, for example by having conveyor sections of a picking station in one level using airspace above a conveyor section of the respective picking station in the other level, so that a compact and efficient use of space is achieved, vertically as well as horizontally. Alternatively (or additionally) in accordance with the invention, each order fulfillment level has at least one further virtual order fulfillment level in which connecting conveyor systems connecting to picking stations are arranged at different height from the at least one order fulfillment level. This also makes use of vertical space more effectively. In other words, the connecting conveyor systems are vertically stacked to use space effectively and at the same time increase throughput and scalability.

According to a further embodiment of the invention, it is also possible that the picking stations connected to different fulfillment levels are horizontally distributed in a longitudinal direction along the main conveyor of the connecting conveyor system (e.g. staggered in cross aisle direction referring to a storage racking opposite). In this manner, using airspace above a conveyor section of the respective picking station in the other level is no longer realized so that a compact and efficient use of space is not achieved. However, as it increases the amount of connecting conveyors (e.g. cross aisle conveyors) whilst quantity of storage aisle and picking station remain unchanged, it has a benefit of significant increase of material flow capacity going through connecting conveyors (e.g. cross aisle conveyors) thus providing more scalability by means of increasing quantity of storage aisles and picking stations without causing traffic congestion on the connecting conveyor system(s). Picking stations are usually, but not limited to, connected to each cross-aisle conveyor level in an alternating manner (lower and upper connecting conveyor alternating in connection to picking stations).

With this concept, both first and second connecting conveyor systems are horizontal and either first or second picking station (alternating) is provided with elevated platform or either or both first and second connecting conveyor systems may include inclined and/or declined interface conveyors and some or all picking stations can be located on the floor level. In case there are more than two connecting conveyor systems and levels (cross aisle conveyors in vertically arranged levels), horizontal, inclined and declined interface conveyors may be used.

A combination of inclined/declined interface conveyors (for connection to the main connecting conveyor) and raised platforms is possible and it is especially useful when two order fulfillment levels are used and there are three connecting conveyor system levels. In other words, it is possible to have different combinations connecting conveyor levels and order fulfillment levels quantity. Usually there will be a 1:1 correspondence between connecting conveyor levels and order fulfillment levels. However, there could also be a 2:1 arrangement or 3:1 arrangement or a 3:2 arrangement. In such arrangements, the picking stations could be connected multiple connecting conveyor levels. The picking stations may be manual picking stations, automated picking stations or fully automated picking stations. If they are fully automated then it is preferred (but not limited to), that the picking stations in the at least one and/or virtual order fulfillment level(s) are robotic stations.

In automated warehouses there are areas between the storage racking and the picking stations in the so-called pre-zone or front zone between the racking and the picking stations in which there are many connecting conveyor systems and across the aisle conveyors such that areas are formed which are not easily to be entered or accessed by human operators. These areas can still be of beneficial use if robotic picking stations are located therein. These do not need to be entered or exited by operators. Therefore, according to the invention, robotic picking stations are located on the product storage side of the connecting cross aisle conveyor, with a dedicated connecting conveyor system in its own virtual order fulfillment level. The robotic picking stations may also be located on the product storage side of the connecting cross aisle conveyor. Then they have a shared connecting conveyor system in the at least one order fulfillment level or virtual order fulfillment level. This allows to make use of non-accessible areas which also exist in the classical area of the picking stations due to the multiple connecting conveyor systems supplying the goods to person stations therein.

In other words, the invention can be characterized, as not only making use of horizontally available space in an order fulfillment level in which picking stations are arranged, but by also making use of the free vertical airspace above (or below) these stations by setting up a virtual order fulfillment level including its own picking stations and connecting conveyors. This is done without installing complete additional flooring or mezzanine levels.

Further features and details of the invention are apparent from the description hereinafter in connection with the drawings.

DESCRIPTION OF THE PREFERRED EMBODIMENTS

Figure 1:
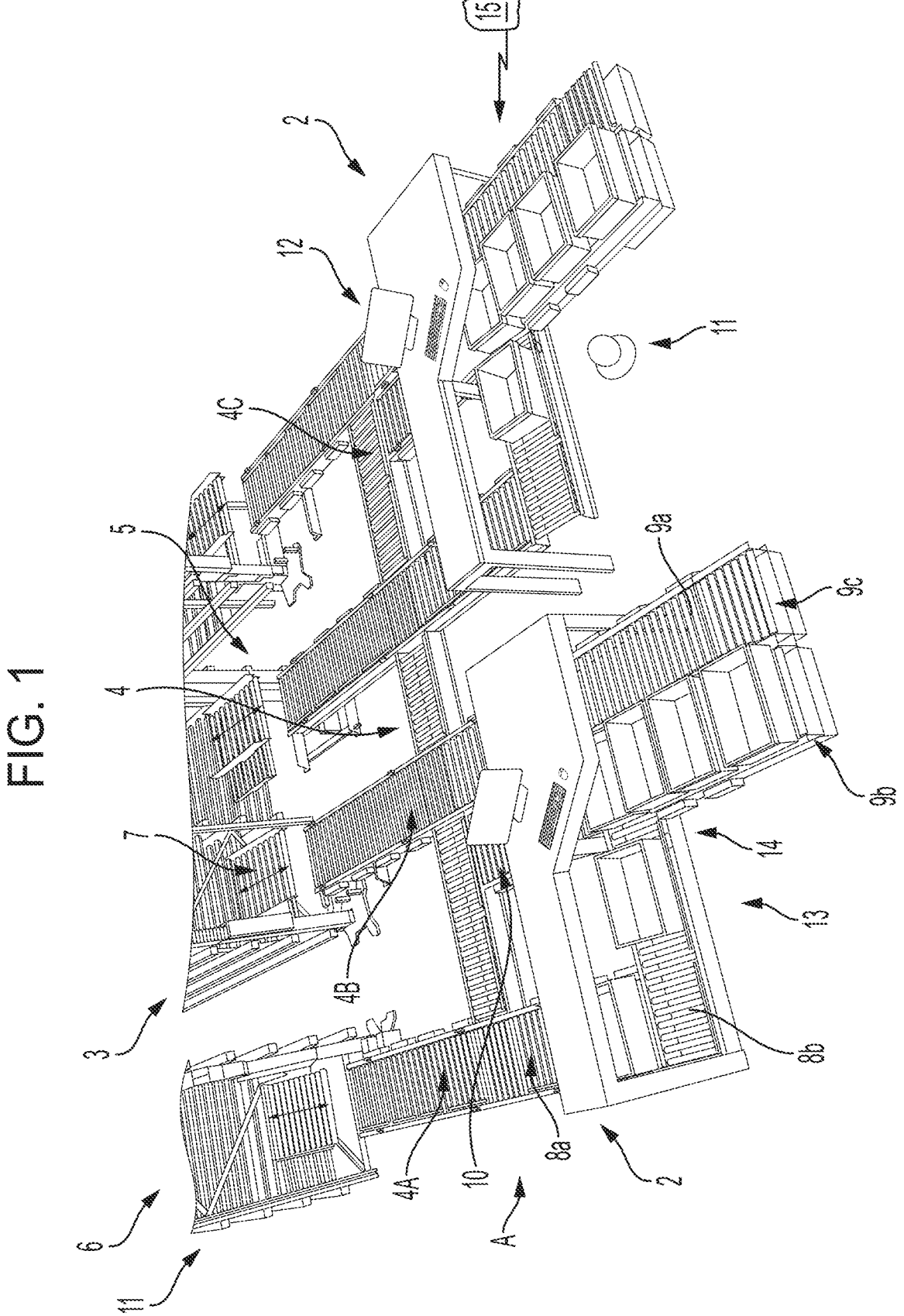
FIG. 1 shows a schematic perspective view of a picking area with two picking stations for general reference.

In FIG. 1 a schematic perspective view of a picking area 1 with two picking stations 2 that are connected to a racking 3 by conveyors 4 in an order fulfillment level A is shown. Each picking station 2 corresponds to an aisle 5 of the racking 3 with the racks 6 neighboring the aisle 5 in between and is connected to a load carrier vertical conveyor 7 (e.g. a lift or elevator) arranged within the footprint of each rack 6 at its front end via the conveyors 4. The racks are serviced by ASRS machines not shown, e.g. shuttles, that drop off loads to the vertical conveyors 7. Conveyor 4c is a connecting conveyor system in the form of a cross aisle conveyor running the length of the front of the racking 3 across all aisles 5 and possibly on to a not shown packaging area.

The conveyors 4a, b bridge the racking 3 and the picking stations 2, connecting to an inbound product load carrier conveyor 8a, b and an inbound order load carrier conveyor 9a, b and a common take away discharge conveyor 10. The load carriers themselves can for example be standard containers or trays.

Inbound product load carrier conveyor 8 has a first conveying section 8a leading into the station in extension of the (longitudinal or down) aisle direction and a second conveying section 8b oriented 90 degrees thereto forming the actual conveying system within the station for presentation of the load carriers with products to pick from to the operator 11.

Inbound order load carrier conveyor 9 has a first inbound conveying section 9a leading into the station in extension of the (longitudinal or down) aisle direction and a second conveying section 9b which is arranged in parallel thereto connected by a right-angle-transfer (RAT) 9c.

Product load carrier conveyor section 8b and load carrier conveyor section 9b intersect each other and are forming an operating position 13 for the operator and intersection 14. The intersection can be formed in a wide range of angles, but usually will be in the range between 60 and 120 degrees, preferably 90 degrees.

Common take away discharge conveyor 10 is arranged in direct extension of order load carrier conveyor section 9b and starts at the intersection 14 with product load carrier conveyor section 8b.

Each picking station 2 may include a display and controls 12 for information of and control by the operator 11. The operator may also be guided by other means, like pick-by-light, pick-by-voice and extended/augmented reality etc. The picking station may also not have any such means and picking may be performed based on "paper".

Product load carrier conveyor section 8b as a whole may be tilted towards the operating position 13. Another optimization in relation to presentation may be to tilt pick and/or put position. Tilting of the donor position is done by means of tilting conveyor 8b itself allowing the product load carrier to be tilted when it is transferred from 8a to 8b. Tilting of order positions can be done by means of active tilting mechanism e.g. tilted RAT (Right Angle Transfer) and only corresponding put position can be tilted (adaptive tilting) providing operator a distinct indication where the picked items are put to.

The conveyors are controlled by controller 15 to provide a simultaneous and continuous conveyance flow of product and order carriers through the picking station 2 on the respective conveyors 8, 9 and 10 in accordance with the needs for order fulfilment, which in turn is managed by an overall warehouse management system (WMS) interacting and interfaced with an order tracking system. Obviously also the controller is used to control overall material flow within the racking 3 and 5 and from there to the picking stations 2 and 3.

In the following schematic FIGS. 2-10 disclose variations in design and operation of analogous picking stations 2 according to the invention are described, especially with respect to the use of an additional virtual order fulfilment level(s) B vertically spaced with respect to the order fulfilment level A for better use of space.

In FIGS. 2A, 2B and 3A, 3B an order fulfillment area 1000 is shown that includes the order fulfilment level A as described above with respect to FIG. 1 and additionally a virtual order fulfilment level B including further picking stations 20 and connecting conveyor systems 40, all vertically spaced above the order fulfilment level A.

Same as in FIG. 1, picking stations 2 are connected to a racking 3 by conveyors 4 in order fulfillment level A and additionally picking stations 20 are connected to a racking 3 by conveyors 40 in virtual order fulfillment level B. As above each picking station corresponds to an aisle 5 of the racking 3 with the racks 6 neighboring the aisle 5 in between and is connected to a load carrier vertical conveyor 7 (e.g. a lift or elevator) arranged within the footprint of each rack 6 at its front end via the conveyors 4, 40. The racks are serviced by ASRS machines not shown, e.g. shuttles, that drop off loads to the vertical conveyors 7. In this respect, virtual order fulfilment level B is more or less a duplicate of order fulfilment level A and arranged above it. To allow this, some additional installations and changes have been implemented which will be described below.

Conveyor 40c is a cross aisle conveyor running the length of the front of the racking 3 across all aisles 5 and possibly on to a not shown packaging area, arranged above conveyor 4c.

The conveyors 40a, b bridge the racking 3 and the picking stations 20, connecting to an inbound product load carrier conveyor 80a, b and an inbound order load carrier conveyor 90a, b and a common take away discharge conveyor 100. These are arranged above the respective elements in the level A, using the airspace directly above. The load carriers themselves can for example be standard containers or trays.

To service conveyor system 4 and 40 at the same time, especially the conveyors 4a, b and 40a, b connecting to the racking 3, load carrier vertical conveyor or AS/RS 7 may be used in an embodiment (not shown) having a duplicate load handling platform vertically spaced to align with the two order fulfilment levels A, B so as to be able to discharge and/or receive articles from both levels at the same time.

The picking stations 20 are manually 11 or robotically R operated. Two picking stations 2, 20, one from each order fulfilment level, are also grouped (see FIG. 3 showing the respective group of manual picking stations 2, 20) in close horizontal relationship to create a densely packaged fulfilment area containing many picking stations.

The vertical spacing is realized by having all elements of the virtual order fulfilment level raised by use of uprights, raised platforms etc. The amount of vertical offset is slightly larger than the height of the containers used as load carriers due to but not limited to conveyor height and clearance between conveyor and load carriers.

Figure 2A:
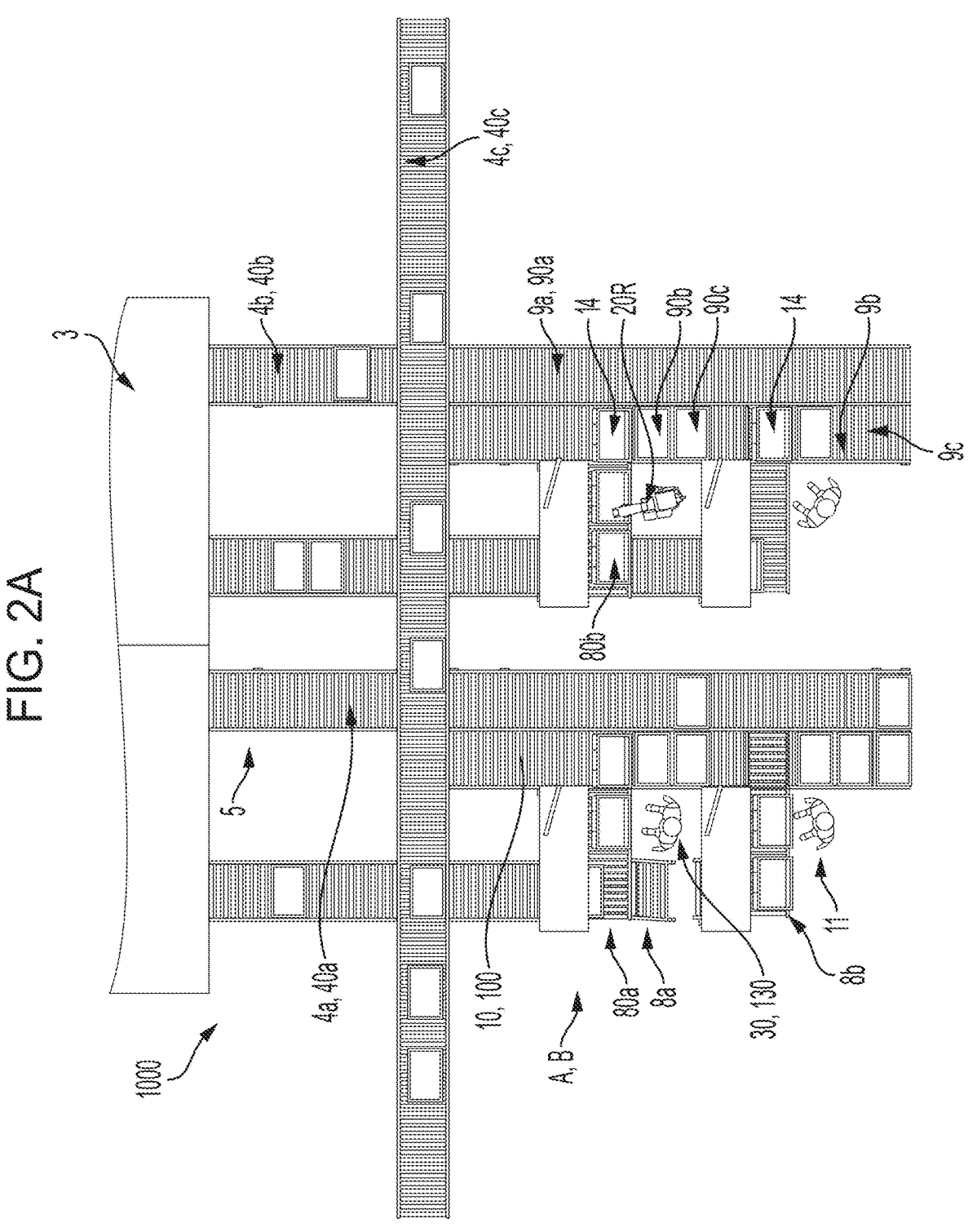
FIG. 2A shows a schematic plan view of a picking station according to the invention.
Figure 2B:
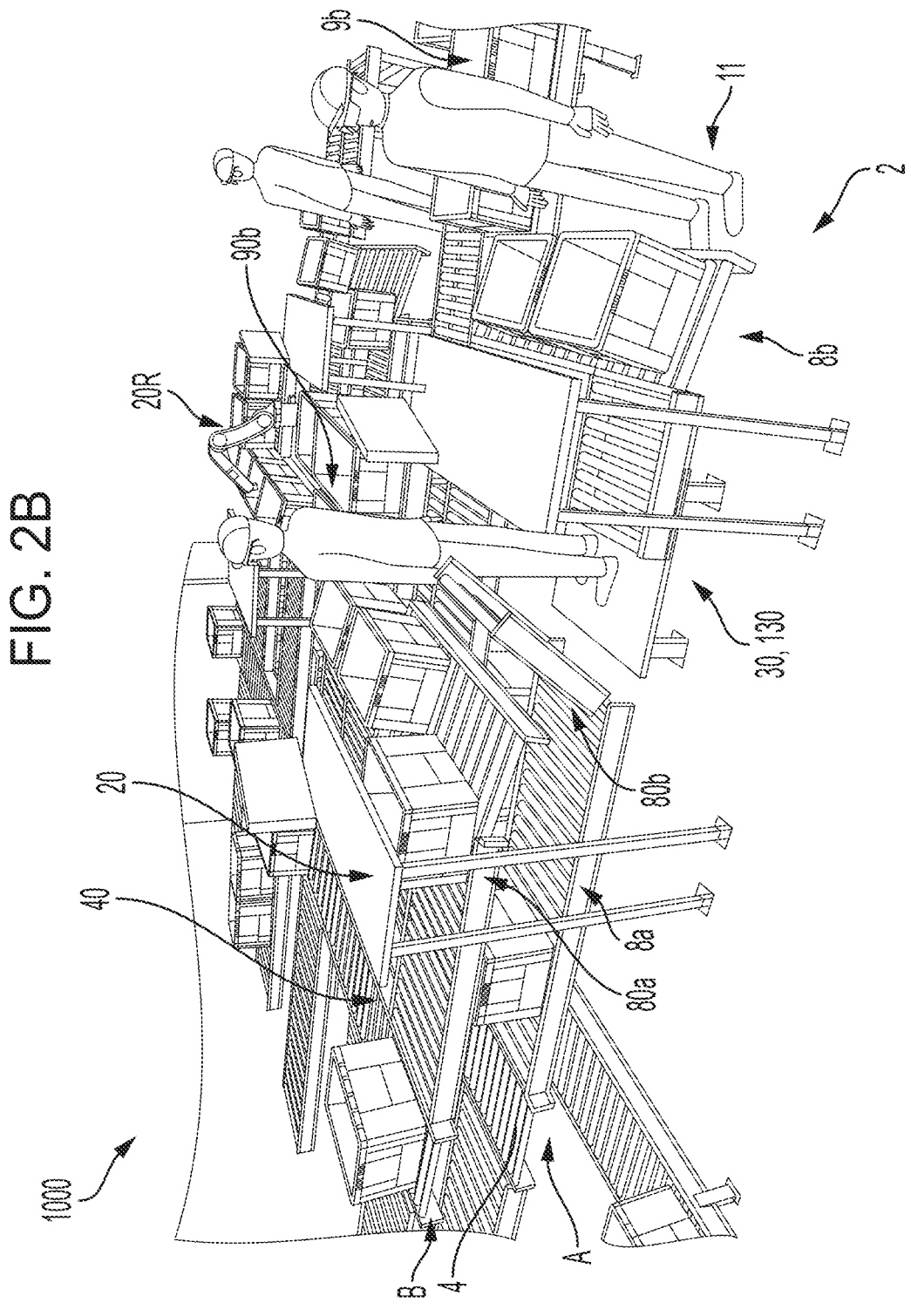
FIG. 2B shows a schematic perspective view of the further picking station according to FIG. 2A.
Figures 3A, 3B:
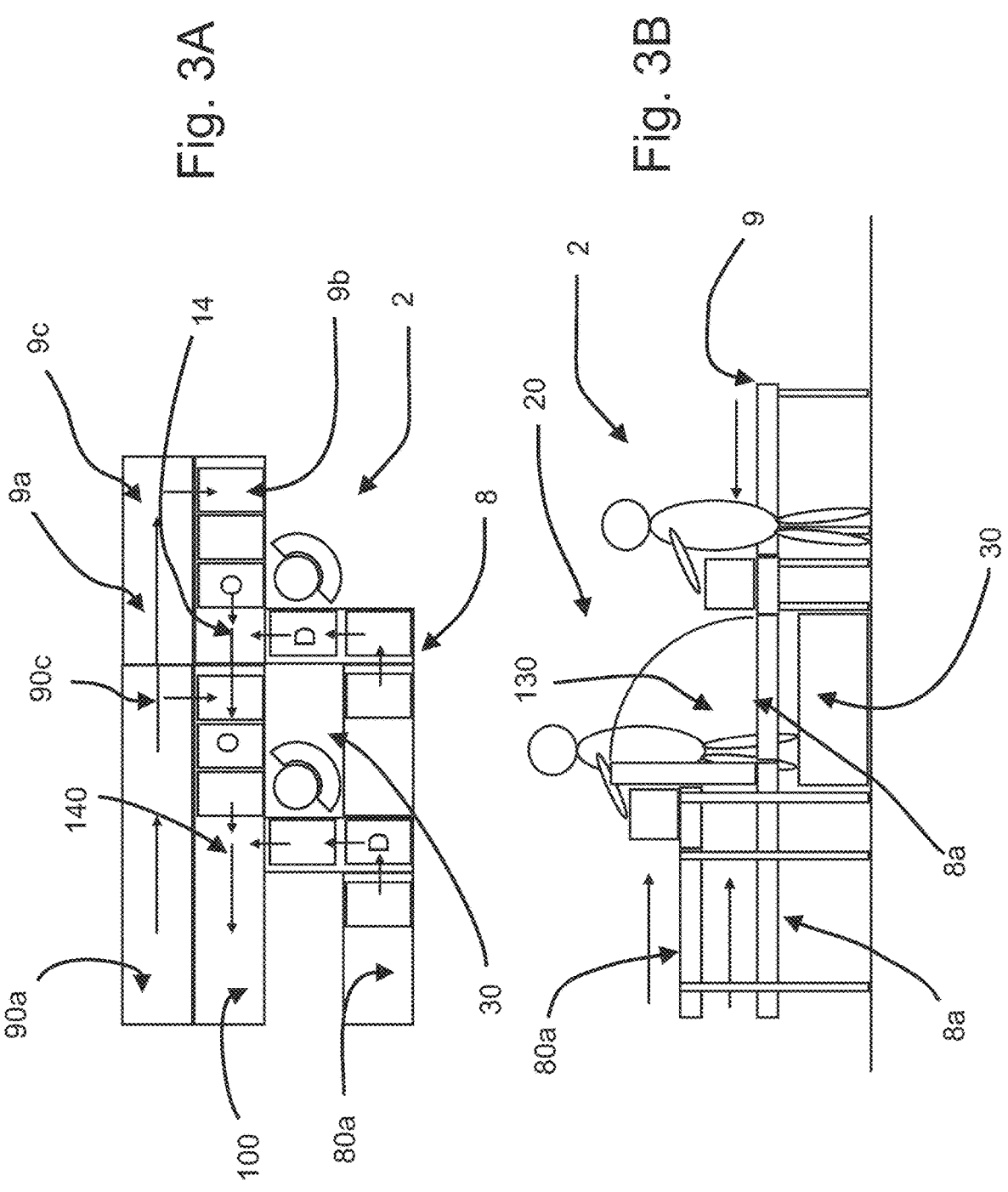
FIGS. 3A and 3B show a schematic plan and side view of a further picking station according to the invention.

The operating position 130 in the picking station 40 is for example raised by using a platform 30. To allow human operators 11 access to the platform 30 respectively the operating position 130, a section of inbound product load carrier conveyor 8*a* can be raised as best seen in FIG. 2B or 3B or step over can be provided if 8*a* is not raised. Such is not needed for robotically operated stations 20R as indicated in FIG. 2A.

As seen in FIGS. 2 and 3, virtual order fulfilment level B is independent of order fulfilment level A. Only air space is shared, no conveyor systems. The flow or routing of load carriers is generally the same as described in FIG. 1 with the respective adaptations to the changes, as indicated in FIG. 3. The direction of flow of the load carriers is indicated by the arrows.

Figures 4A, 4B:
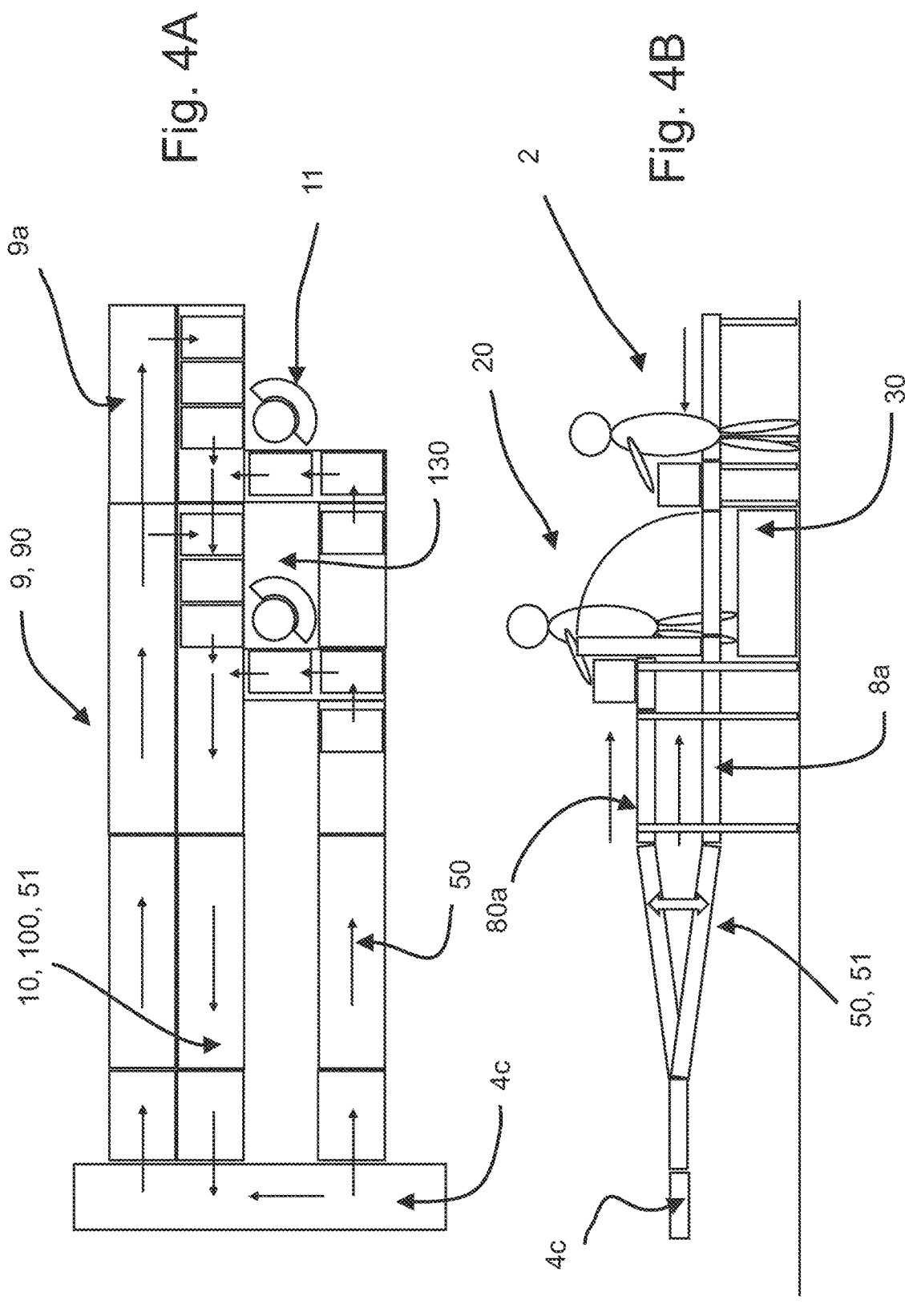
FIGS. 4A and 4B show a schematic plan and side view of a further picking station according to the invention.

The embodiment in FIGS. 4A and 4B differs from that of FIGS. 2 and 3 in that the picking stations 2, 20 in order fulfilment levels A, B share sections of connecting conveyor system 4 respectively 40. To begin with, the cross-aisle conveyor 4*c* respectively 40*c* is shared (as shown) and in analogy the bridging conveyors 4*a, b* respectively 40*a, b* (not shown) are also shared. In other words, only one connecting conveyor 4 system is present.

To implement access to both levels, inbound product load carrier conveyor 8*a, b* and 80*a, b* share a common inbound vertically moveable switch 50 and inbound order load carrier conveyor 9*a, b,* and 90*a, b,* share a common inbound vertically moveable switch 52 that changes its discharge between the different levels as indicated by the arrow. Likewise, takeaway discharge conveyor 10 and 100 share common outbound vertically moveable switch 51 that changes its merge between the different levels as indicated by the arrow.

Figures 5A, 5B:
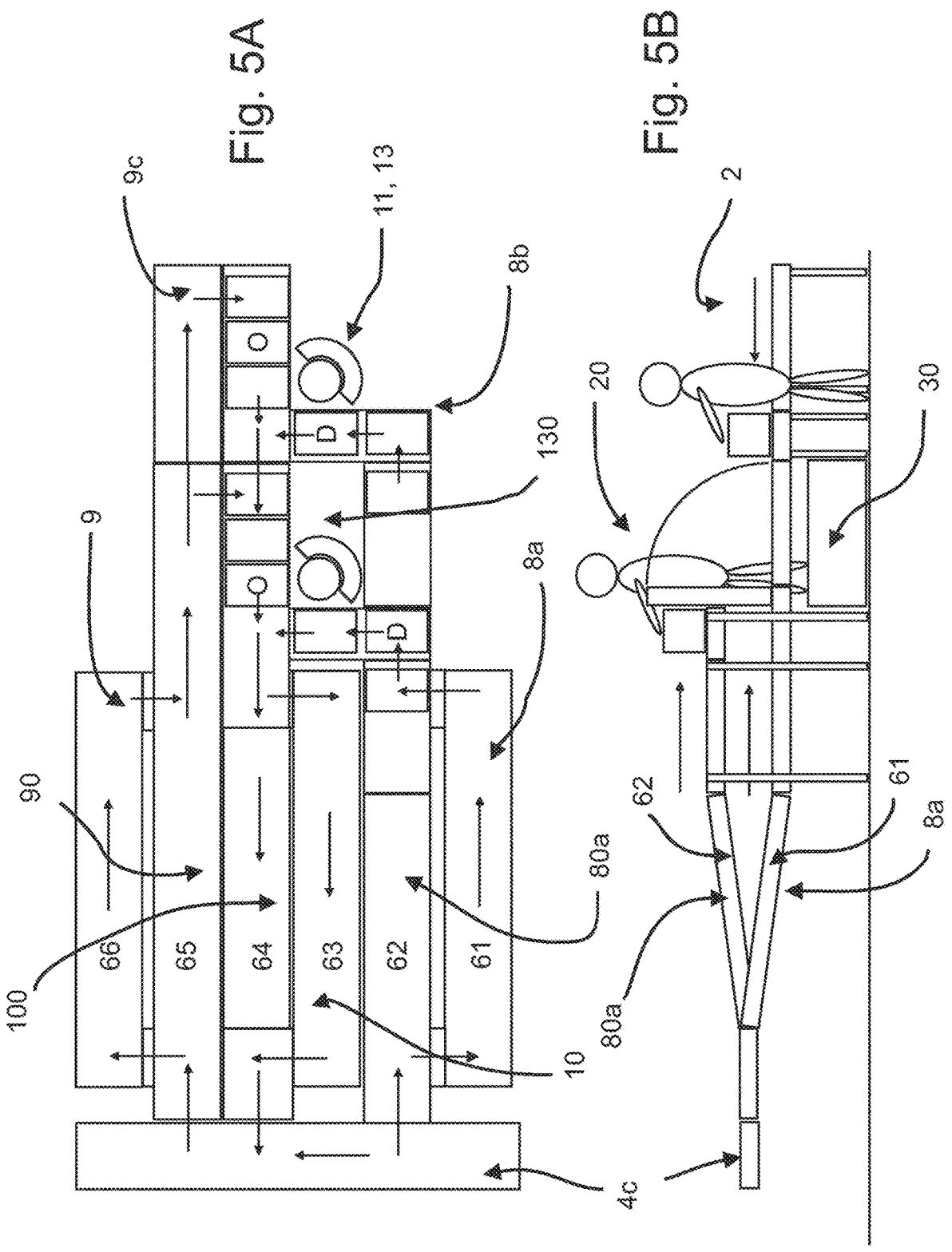
FIGS. 5A and 5B show a schematic plan and side view of a further picking station according to the invention.

The embodiment in FIGS. 5A and 5B differs from that of FIG. 4 in that inbound product load carrier conveyor 8*a, b* and 80*a, b,* inbound order load carrier conveyor 9*a, b* and 90*a, b* as well as take away discharge conveyor 10 and 100 are implemented to also interface with the mutual cross aisle conveyor 4*c* by means of fixed ramps. To do so, respective ramps 61, 62, 63, 64, 65 and 66 are used for inbound supply and discharge of load carriers from and to mutual cross aisle conveyor 4*c* respective connecting conveyor system 4.

Ramp 61 connects declining to conveyor 8*a*. Ramp 62 connects inclining to conveyor 80*a*. Ramp 63 connects declining to conveyor 10 using RATs. Ramp 64 connects inclining to conveyor 100. Ramp 65 connects inclining to conveyor 90 and ramp 66 connects declining to conveyor 9. Alternatively, ramps 61 and 66 can be inclined and ramps 62 and 65 can declined.

Figures 6A, 6B:
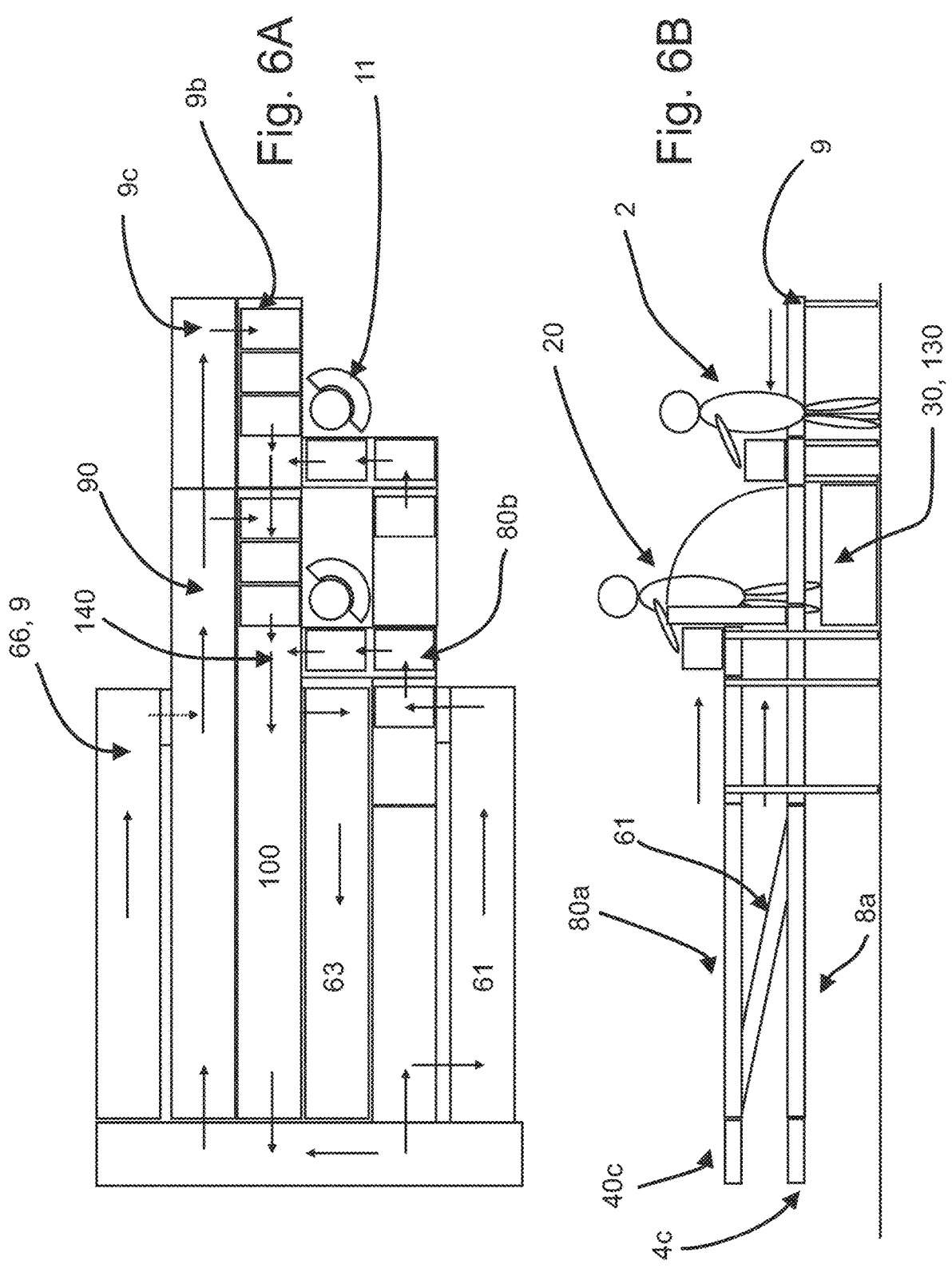
FIGS. 6A and 6B show a schematic plan and side view of a further picking station according to the invention.

FIGS. 6A and 6B differs from FIG. 5 in that two cross aisle conveyors 4*c*, 40*c* are implemented directly above each other or with some horizontal offset and inbound product load carrier conveyor 8*a* is connected by a ramp 61 and take away discharge conveyor 10 by a ramp 63 too. Declining ramp 66 connects to inbound order load carrier conveyor 9 first running parallel to conveyor 90 and then below, as indicated by the hashed arrow, after reaching the corresponding height of level A. To keep the grouped picking stations compact, the connection from ramp 66 to inbound conveyor section 9*a* is performed via RATs.

Figures 7A, 7B:
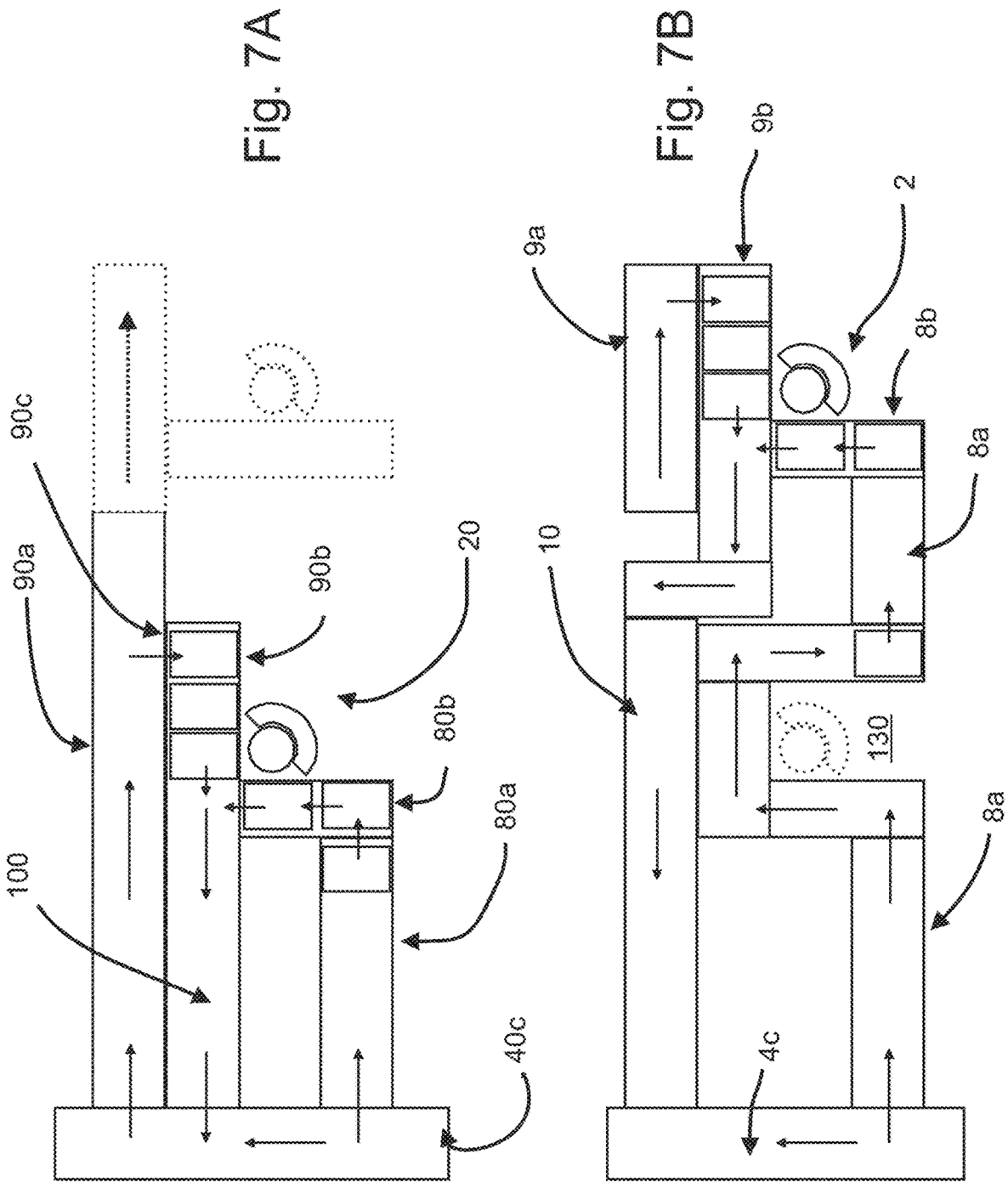
FIGS. 7A and 7B show a schematic plan view of the upper level and lower level of a further picking station according to the invention.

FIGS. 7A and 7B shows a further picking station implementation again having two cross aisle conveyors 4*c*, 40*c* are implemented directly above each other or with some horizontal offset. The upper level B includes only the connecting conveyor system 40 for the picking station 20 and the lower level A includes only the connecting conveyor system 4 for the picking station 2, wherein the connecting conveyors 8, 9 and take away conveyor 10 snake around the picking station 20 in the upper level.

The upper virtual order fulfilment level B of FIG. 7A has a configuration like FIGS. 2 and 3 in that it has connecting conveyors all in the same level and with straight connection paths to the cross-aisle conveyor 40*c*. In the lower order fulfilment level A of FIG. 7B has a configuration similar to FIGS. 2 and 3, however differing therefrom in that the inbound product load carrier conveyor 8 snakes around operating position 130 of picking station 20 of level B as depicted. This allows easy human access without a step over or raised conveyor section (as above).

Inbound order load carrier conveyor 9 and outbound take away conveyor 10 in turn also circumvent picking station 20 and at the same time inbound product load carrier conveyor 8.

Figures 8A, 8B:
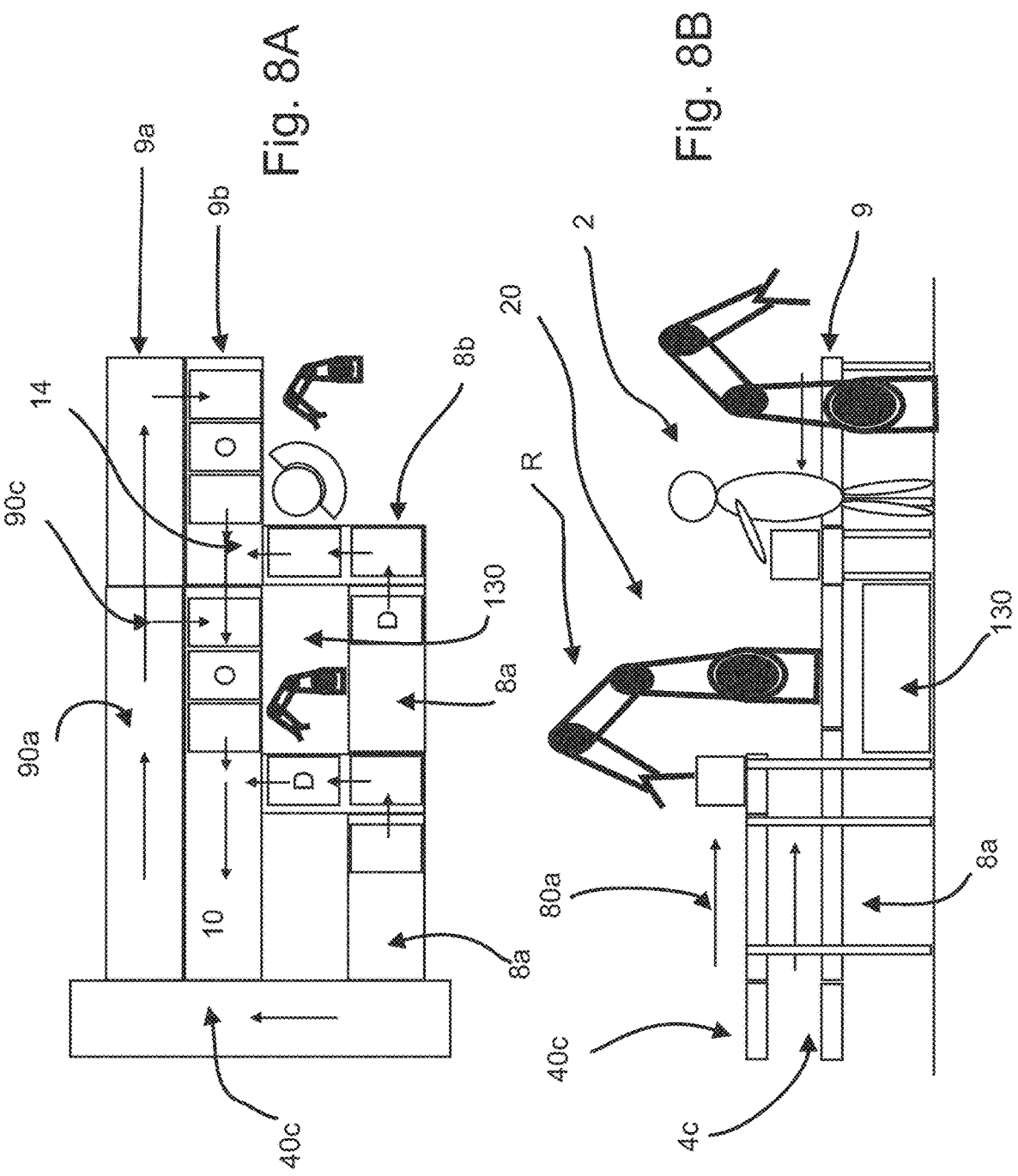
FIGS. 8A and 8B show a schematic plan and side view of a further picking station according to the invention.

The embodiment shown in FIG. 8 is essentially that of FIG. 3 wherein the picking station 20 in order fulfilment level B is robotically operated by robot R. Picking station 2 in order fulfilment level B may be either manual, robotic or both meaning that a robot R augments the operators 11 work.

Figures 9A, 9B:
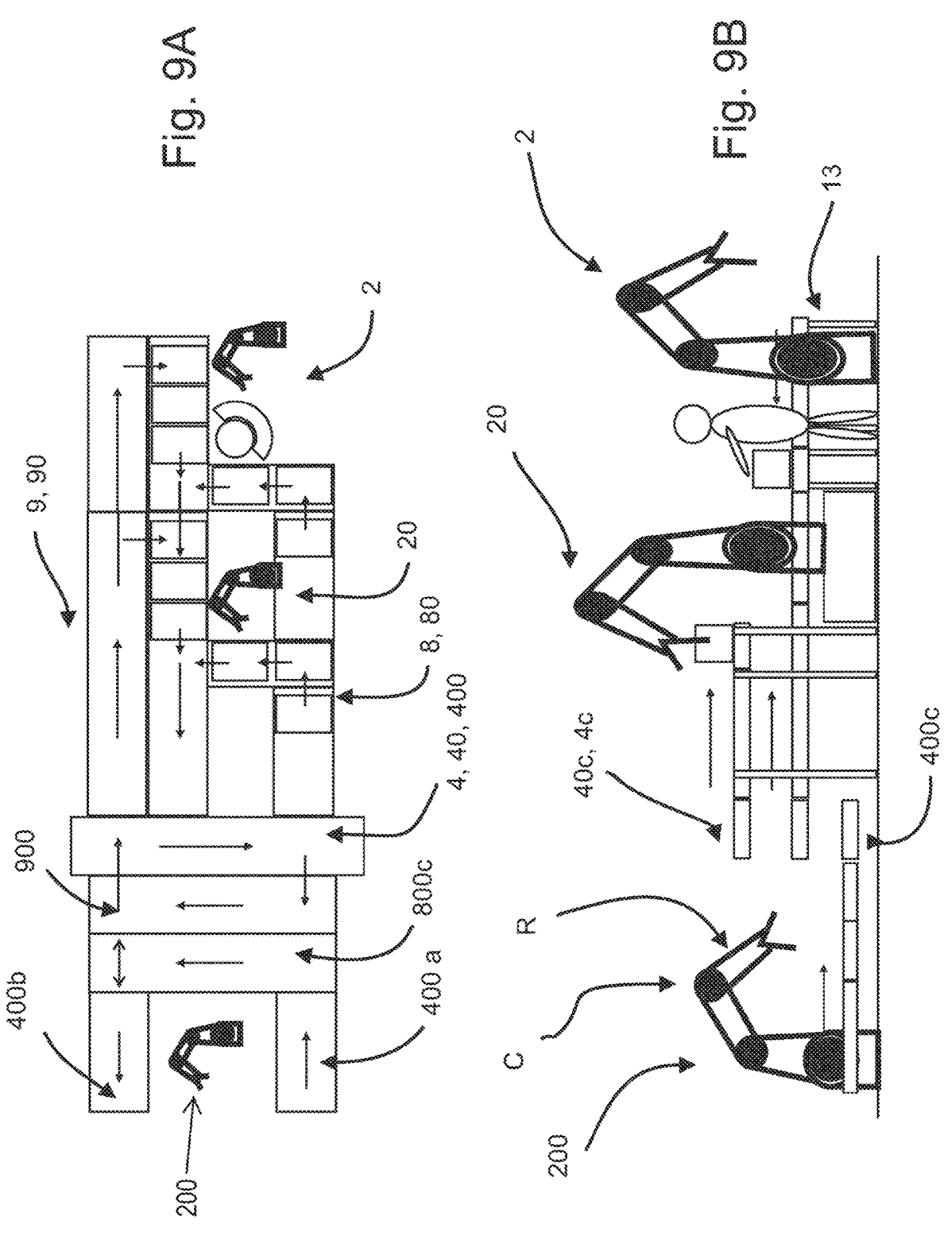
FIGS. 9A and 9B show a schematic plan and side view of a further picking station according to the invention.
Figure 10:
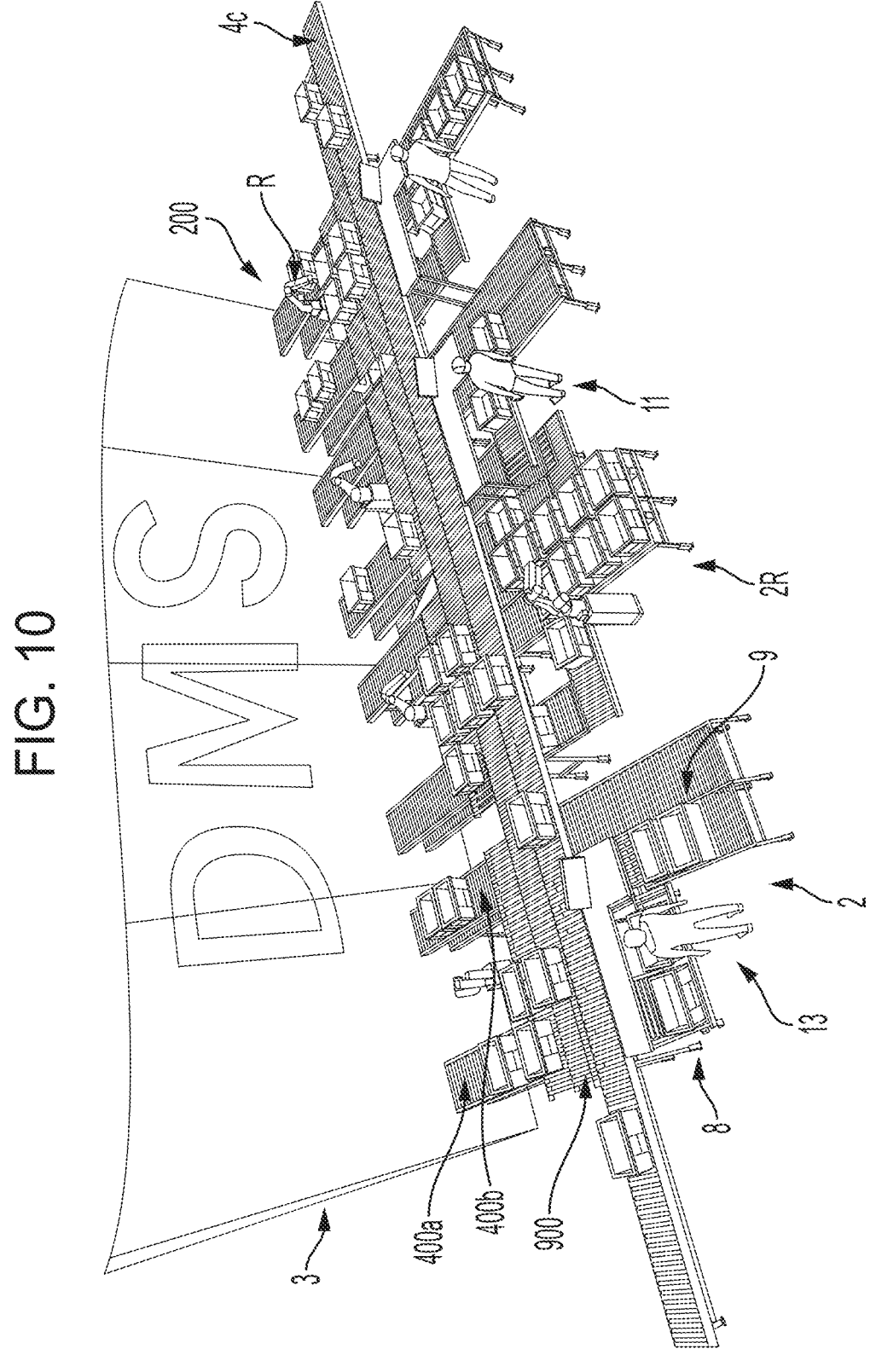
FIG. 10 shows a perspective view of the order fulfilment area according to FIG. 8.

In the further embodiment of FIG. 9, the picking stations 2 and 20 in levels A and B are same as in FIG. 8. Additionally, a third order fulfilment level C is added below level A which has a robotic picking station 200 that is connected by a connecting conveyor system 400. It is to be understood that level C may also be arranged above level A or B as shown in FIG. 10.

This station 200 is on the opposite side of the cross-aisle conveyors 4*c*, 40*c*, 400*c* which are above each other or with some horizontal offset. Therefore, it is positioned between the connecting conveyor systems 4, 40 and 400 and the racking 3, which can be seen in FIG. 10. In FIG. 10 the order fulfilment level B has been omitted for better understanding. However, it is also possible that only levels A and C are implemented together.

Picking station 200 has its own dedicated conveyors 800 for product load carriers and 900 for order load carriers as well as a connection to cross aisle conveyor 400*c* by RAT for take away.

Figures 11A, 11B:
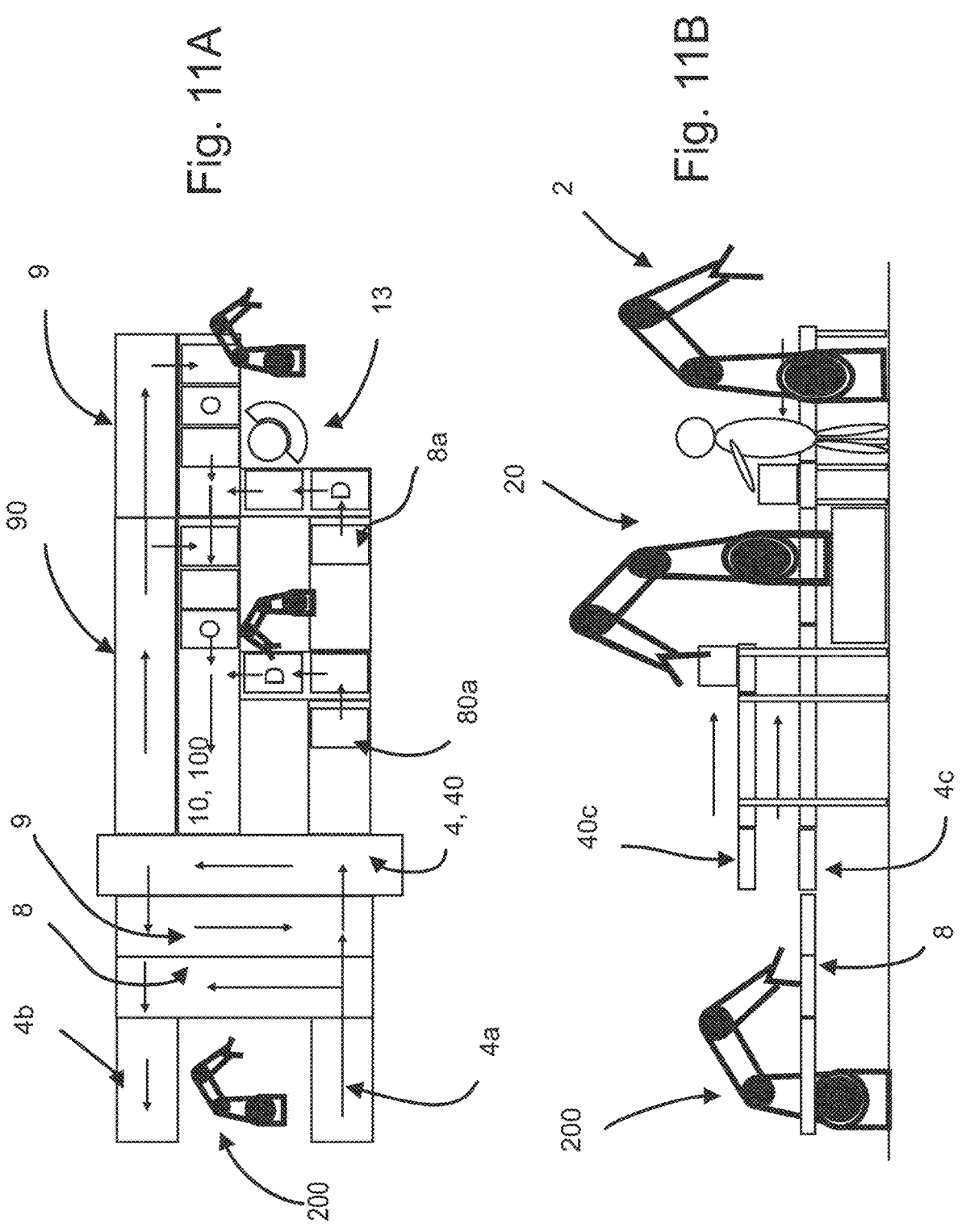
FIGS. 11A and 11B show a schematic plan and side view of a further picking station according to the invention.

The embodiment of FIG. 11 is similar to that of FIG. 9 in the positioning of picking station 200 on the opposite side of the cross-aisle conveyors 4, 40. However, in contrast to before, there is no additional order fulfilment level C but picking station 200 is arranged within order fulfilment level A and shares its connecting conveyor system 4.

Figures 12A, 12B:
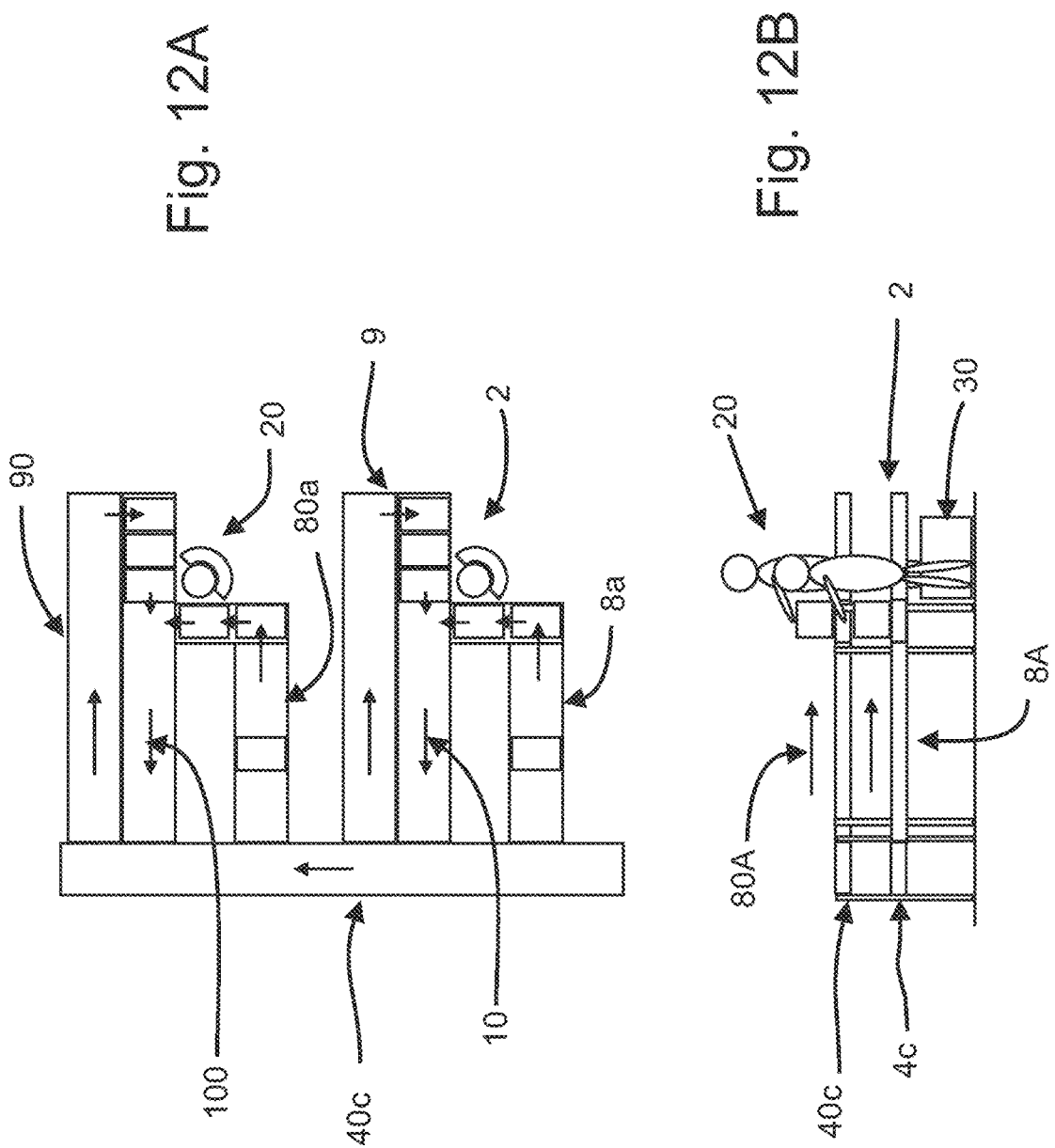
FIGS. 12A and 12B show a schematic plan and side view of a further picking station according to the invention.
Figures 13A, 13B:
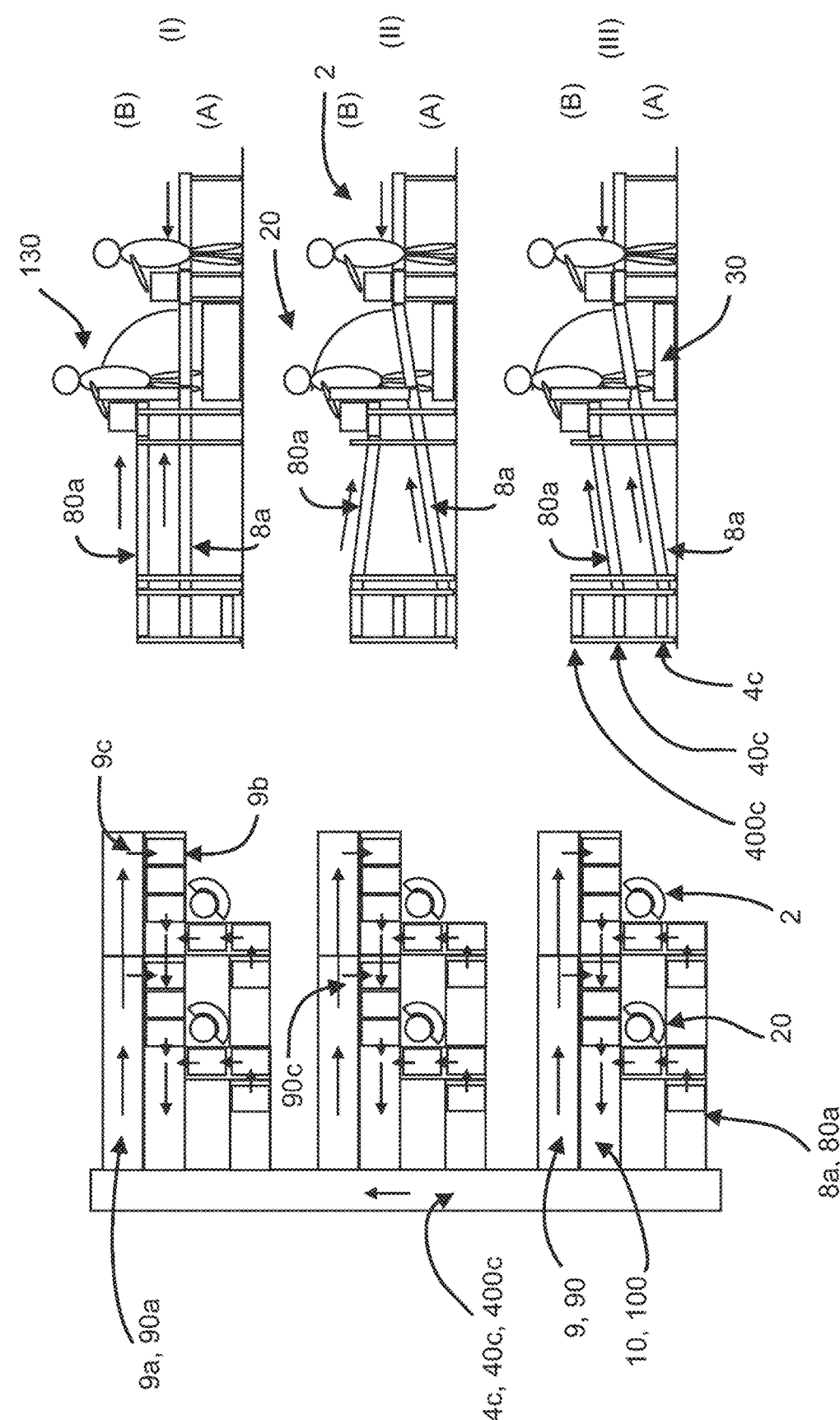
FIGS. 13A and 13B show a schematic plan and side view of a further picking station according to the invention.

FIGS. 12-14 show embodiments of the invention in which the picking stations are horizontally distributed in a longitudinal direction along the main conveyor of the connecting conveyor system and either connected to each dedicated connecting conveyor system in its own level and/or to connecting conveyor systems of the other levels. In FIG. 12 an alternative to FIG. 3 is shown in which the two picking stations do not share air space but are arranged in a horizontally spaced manner along the conveyors 4*c*, 40*c* (see FIG. 12A). Otherwise the installations are the same as in FIG. 3. In FIG. 13 an alternative to FIG. 3 is shown in which the picking stations 2, 20 in order fulfillment levels A and B again share air space, but there are now three connecting conveyor systems 4, 40, 400 (similar to FIG. 9). Therefore, the picking stations 2, 20 are same as in FIG. 3 but now have different interfaces to connecting conveyor systems 4, 40, 400, i.e. conveyors 4*c*, 40*c*, 400*c*, which may be arranged on same or differing levels.

Three examples I, II and Ill are shown (from top to bottom).

Example I has the same configuration as in FIG. 3 in such that it only has an interface to conveyors 40*c*, 400 *c* arranged on same levels and that the lowest conveyor 4*c* (on different not corresponding level) is not connected to the picking stations 2, 20 of example I.

In example II the order fulfillment levels A and B are arranged vertically at heights between those of the connecting conveyor systems 4, 40, 400, i.e. conveyors 4*c*, 40*c*, 400*c*. Additionally, the picking stations 2, 20 are again (as in the previous example I) only connected to two conveyors 4*c*, 400*c*. Due to the height difference the conveyors interfacing picking station 2 have an incline and those of picking station 20 have a decline (both from a perspective of conveyor 4, 400). For example, conveyors 8*a*, 80*a* have an incline for 8*a* and a decline for 80*c*.

In example III the overall arrangement is the same as in example II, with the difference that the lower two connecting conveyor systems 4, 40, i.e. conveyors 4*c*, 40*c* are interfaced to the picking stations 2, 20. Therefore, due to the height difference the conveyors 8*a*, 80*a* (and all others, e.g. 9, 90, 10, 100 etc.) have a decline/incline only. For example, both conveyors 8*a*, 80*a* have an incline for 8*a* and for 80*c* in the transportation direction from 4*c*, 40*c* to the picking stations 2, 20.

Of course, all three examples I, II, III of FIG. 13 may be combined in same embodiment and it may depend on traffic balance among connecting conveyors 4*c*, 40*c* and 400*c*. For example FIG. 13 shows six picking stations in total and two picking stations are connected to each connecting conveyor of a level achieving a good balance in conveyor traffic.

Figures 14A, 14B:
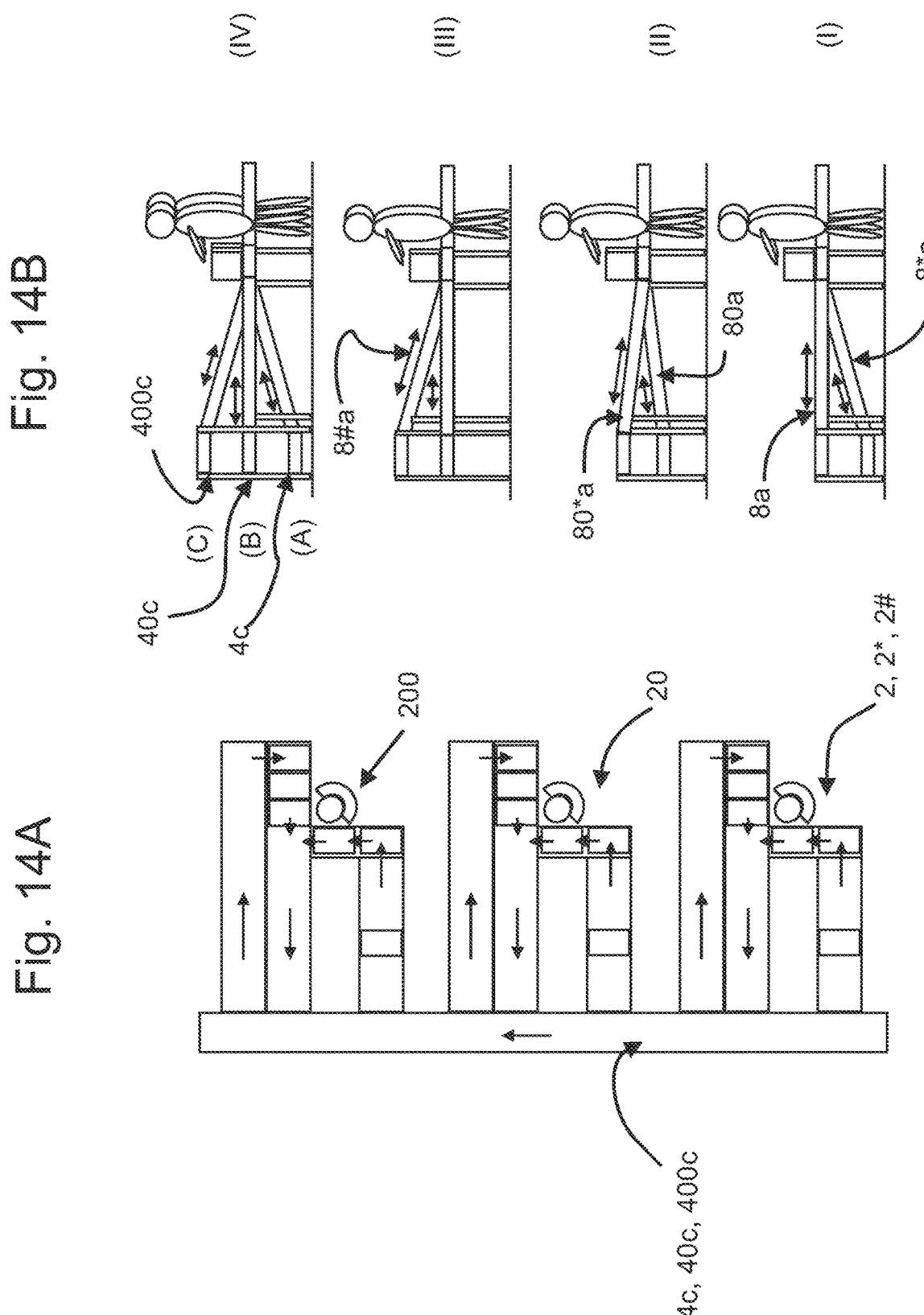
FIGS. 14A and 14B show a schematic plan and side view of a further picking station according to the invention.

In FIG. 14, there are three connecting conveyor systems 4, 40, 400 (similar to FIG. 13) in different order fulfilment levels A, B, C but the picking stations 2, 20, 200 are arranged in same floor level, as will be explained below. In this embodiment, the order fulfilment levels are defined by the connecting conveyor system. The picking stations 2, 20, 200 are each only connected to a single connecting conveyor system 4, 40, 400 or respective cross-aisle conveyor 4*c*, 40*c*, 400*c*. Depending on the initial height and arrangement (as best seen in FIG. 14B), several variations are possible for implementing the connecting interface conveyors.

Using two connecting conveyor systems, the interface conveyors may be essentially horizontal if the picking station 2 is on same height (see example I—conveyor 8*a*) or be inclined (towards the picking station) if the picking station 2* is higher than the connecting conveyor (see I—alternative conveyor 8*a). Alternatively, as shown in relation to example III, the connecting interface conveyor (see example III—alternative conveyor 8 #a) may be declined, if the height of the picking station 2 #is lower.

If the picking station 20 is arranged in a level between those of conveyors 4*c*, 40*c* (see example II), then the connecting conveyor 80*a* may be declined or inclined (see alternative conveyor 80*a—example II).

When all such alternatives are viewed from the side, see example IV, it becomes clear that if the picking station 200 is on a level with order fulfilment level B of connecting conveyor system 40, then the interface conveyors may be inclined if the station is connected to conveyor 4*c*, horizontal if connected to 40*c* or declined if connected to 400*c*.

Obviously all variants and versions described above may be combined as necessary depending on the warehouse needs.

The invention claimed is:

1. A warehouse for order fulfilment comprising:
a product storage having aisles;
at least one order fulfillment level in which picking stations are arranged and supplied with articles from the product storage for picking into order load carriers according to allocated orders;
wherein each picking station is supplied with articles from the product storage by a connecting conveyor system on the least one order fulfillment level;
wherein each order fulfillment level has at least one further virtual order fulfillment level in which picking stations are arranged at different height from the at least one order fulfillment level or in which connecting conveyor systems connecting to picking stations are arranged at different height from the at least one order fulfillment level; and
wherein the picking stations are grouped to include a picking station in each order fulfillment level and in the associated further virtual order fulfillment level in a horizontally staggered manner in a longitudinal direction of a respective aisle of the product storage so that at least two picking stations of the respective grouped picking stations are horizontally arranged to share airspace by having conveyor sections of the picking station in the virtual order fulfillment level using airspace above a conveyor section of the respective picking station in the associated order fulfillment level.

2. The warehouse for order fulfilment according to claim 1, wherein the picking stations are arranged at different height from the at least one order fulfillment level creating the virtual order fulfillment level by vertically raising the picking stations.

3. The warehouse for order fulfilment according to claim 1, wherein the picking stations arranged in the virtual order fulfillment level(s) are connected to the product storage for supply with articles from the product storage by at least a second connecting conveyor system arranged at a different height than that of the first connecting conveyor system.

4. The warehouse for order fulfilment according to claim 3, wherein the first connecting conveyor system is arranged below picking stations arranged in the virtual order fulfillment level(s).

5. The warehouse for order fulfilment according to claim 1, wherein the picking stations arranged in both the at least one order fulfillment level and the associated at least one further virtual order fulfillment level are connected to the product storage for supply with articles from the product storage by common vertically movable connecting conveyor system.

6. The warehouse for order fulfilment according to claim 3, wherein the picking stations arranged in the virtual order fulfillment level(s) are connected to the product storage for supply with articles from the product storage by at least the second connecting conveyor system arranged horizontally offset to that of the first connecting conveyor system.

7. The warehouse for order fulfilment according to claim 6, wherein the second connecting conveyor system and/or the first connecting conveyor system are curved around the respective picking stations in the other level.

8. The warehouse for order fulfilment according to claim 1, wherein the picking stations in the at least one order fulfillment level and/or the associated at least one further virtual order fulfillment level are robotic stations.

9. The warehouse for order fulfilment according to claim 8, wherein the robotic picking stations are located on the product storage side of the connecting cross aisle conveyor, with a dedicated connecting conveyor system in its own virtual order fulfillment level.

10. The warehouse for order fulfilment according to claim 8, wherein the robotic picking stations are located on the product storage side of the connecting cross aisle conveyor, with a shared connecting conveyor system in the at least one order fulfillment level or virtual order fulfillment level.

11. The warehouse for order fulfilment according to claim 1, wherein the picking stations are connected to a dedicated connecting conveyor system in a corresponding order fulfillment level and/or to connecting conveyor system(s) of the virtual order fulfillment level(s).

12. The warehouse for order fulfilment according to claim 2, wherein the picking stations arranged in both the at least one order fulfilment level and the associated at least one further virtual order fulfillment level are connected to the product storage for supply with articles from the product storage by common vertically movable connecting conveyor system.

13. The warehouse for order fulfilment according to claim 2, wherein the picking stations arranged in the virtual order fulfillment level(s) are connected to the product storage for supply with articles from the product storage by at least the second connecting conveyor system arranged horizontally offset to that of the first connecting conveyor system.

14. The warehouse for order fulfilment according to claim 13, wherein the second connecting conveyor system and/or the first connecting conveyor system are curved around the respective picking stations in the other level.

15. A warehouse for order fulfilment comprising:

a product storage having aisles;

at least one order fulfillment level in which picking stations are arranged and supplied with articles from the product storage for picking into order load carriers according to allocated orders;

wherein each picking station is supplied with articles from the product storage by a connecting conveyor system on the least one order fulfillment level;

wherein each order fulfillment level has at least one further virtual order fulfillment level in which picking stations are arranged at different height from the at least one order fulfillment level or in which connecting conveyor systems connecting to picking stations are arranged at different height from the at least one order fulfillment level;

wherein the picking stations are arranged at different height from the at least one order fulfillment level creating the virtual order fulfillment level by vertically raising the picking stations using raised platforms; and wherein the picking stations arranged in the virtual order fulfillment level(s) are connected to the product storage for supply with articles from the product storage by at least a second connecting conveyor system arranged at a different height than that of the first connecting conveyor system; and wherein the picking stations are grouped to include a picking station in each order fulfillment level and in the associated further virtual order fulfillment level in a horizontally staggered manner in a longitudinal direction of a respective aisle of the product storage so that at least two picking stations of the respective grouped picking stations are horizontally arranged to share airspace by having conveyor sections of the picking station in the virtual order fulfillment level using airspace above a conveyor section of the respective picking station in the associated order fulfillment level.

16. The warehouse for order fulfilment according to claim 15, wherein the first connecting conveyor system is arranged below picking stations arranged in the virtual order fulfillment level(s).

17. The warehouse for order fulfilment according to claim 15, wherein the picking stations in the at least one order fulfillment level and/or the associated at least one further virtual order fulfillment level(s) are robotic stations.

18. The warehouse for order fulfilment according to claim 17, wherein the robotic picking stations are located on the product storage side of the connecting cross aisle conveyor, with either (i) a dedicated connecting conveyor system in its own virtual order fulfillment level or (ii) a shared connecting conveyor system in the at least one order fulfillment level or virtual order fulfillment level.

* * * * *